United States Patent
Atchley et al.

[11] Patent Number: 5,602,745
[45] Date of Patent: Feb. 11, 1997

[54] FUEL DISPENSER ELECTRONICS DESIGN

[75] Inventors: Hans B. Atchley, Greensboro; John J. Ronchetti, Sr., Kernersville, both of N.C.

[73] Assignee: Gilbarco Inc., Greensboro, N.C.

[21] Appl. No.: 374,127

[22] Filed: Jan. 18, 1995

[51] Int. Cl.⁶ .............. B67D 5/08; B67D 5/06; B67D 5/22; B60S 5/02
[52] U.S. Cl. ............ 364/464.23; 222/23; 222/26; 222/27; 222/28; 222/29; 222/30; 222/36; 222/37; 235/94 R; 235/94 A; 364/510; 395/217
[58] Field of Search .................. 222/23, 26, 27, 222/28, 29, 30, 36, 37; 235/94 R, 94 A; 364/405, 465, 510; 377/21

[56] References Cited

U.S. PATENT DOCUMENTS

| | | | |
|---|---|---|---|
| 3,756,630 | 9/1973 | Bickford | 364/465 |
| 3,765,567 | 10/1973 | Maiocco et al. | 364/465 X |
| 3,949,207 | 4/1976 | Savary et al. | 364/510 |
| 4,107,777 | 8/1978 | Pearson et al. | 364/465 |
| 4,216,529 | 8/1980 | Krystek et al. | 364/510 |
| 4,247,899 | 1/1981 | Schiller et al. | 364/465 |
| 4,550,859 | 11/1985 | Dow, Jr. et al. | 222/26 |
| 4,819,714 | 4/1989 | Otsuka et al. | 165/12 |
| 4,849,893 | 7/1989 | Page et al. | 364/434 |
| 4,876,653 | 10/1989 | McSpadden et al. | 364/479 |
| 4,918,690 | 4/1990 | Markkula, Jr. et al. | 370/94 |
| 4,939,728 | 7/1990 | Markkula, Jr. et al. | 370/94.1 |
| 4,967,366 | 10/1990 | Kaehler | 364/479 |
| 4,969,147 | 11/1990 | Markkula, Jr. et al. | 370/94.1 |
| 4,978,029 | 12/1990 | Furrow et al. | 222/1 |
| 5,018,645 | 5/1991 | Zinsmeyer | 222/26 X |
| 5,029,100 | 7/1991 | Young et al. | 364/479 |
| 5,034,882 | 7/1991 | Eisenhard et al. | 364/200 |
| 5,040,577 | 8/1991 | Pope | 141/59 |
| 5,072,374 | 12/1991 | Sexton et al. | 395/800 |
| 5,113,498 | 5/1992 | Evan et al. | 395/275 |
| 5,156,199 | 10/1992 | Hartsell, Jr. et al. | 141/198 |
| 5,182,746 | 1/1993 | Hurlbut et al. | 370/100.1 |
| 5,208,742 | 5/1993 | Warn | 364/131 |
| 5,225,995 | 7/1993 | Fujiwara et al. | 364/510 |
| 5,228,084 | 7/1993 | Johnson et al. | 380/23 |
| 5,269,353 | 12/1993 | Nanaje et al. | 141/59 |
| 5,327,426 | 7/1994 | Dolin, Jr. et al. | 370/85.13 |
| 5,345,979 | 9/1994 | Tucker et al. | 141/1 |
| 5,347,549 | 9/1994 | Baumann et al. | 375/117 |
| 5,355,915 | 10/1994 | Payne | 141/83 |

FOREIGN PATENT DOCUMENTS

| | | |
|---|---|---|
| 0049919 | 4/1982 | European Pat. Off. . |
| 2322491 | 3/1977 | France . |
| 3938503 | 5/1991 | Germany . |
| 1513802 | 4/1978 | United Kingdom . |
| WO92/16905 | 10/1992 | WIPO . |
| WO92/16904 | 10/1992 | WIPO . |
| WO92/16895 | 10/1992 | WIPO . |
| WO93/06670 | 4/1993 | WIPO . |

OTHER PUBLICATIONS

Neuron 3120 Chip and Neuron 3150 Chip Data Book, Apr., 1993.

*Primary Examiner*—Edward R. Cosimano
*Attorney, Agent, or Firm*—Rhodes Coats & Bennett, L.L.P.

[57] ABSTRACT

A fuel dispenser for installation in a service station equipped with a dispenser control console includes a housing, a pump to pump fuel through the housing, a fuel flow meter in the housing, a switch actuable to indicate fuel is to be pumped through the housing, a display on the housing to display the amount of fuel pumped through the housing, and a dispenser control. The dispenser control includes a plurality of microcontroller nodes and a communications bus connecting the microcontroller nodes. A first node is associated with the switch, pump and fuel flow meter, a second node is associated with the display, and a third node is associated with a data link to the dispenser control console. A user may indicate fuel is to be pumped by actuating the switch and generating a signal to the first node, with the first node activating the pump and communicating fuel amount data onto the communications bus, the second node responding to fuel amount data on the bus to display the amount of fuel pumped, and the third node generating a signal to communicate the fuel amount data to the dispenser control console.

48 Claims, 11 Drawing Sheets

FUEL DISPENSER ELECTRONICS DESIGN

BACKGROUND OF THE INVENTION

The present invention relates to improvements in fuel dispenser electronics design. More particularly, the present invention provides a local operating network for a fuel dispenser to permit modular design and construction with minimal wiring and no unused components.

Modem fuel dispensers use microelectronics to assist in carrying out the dispenser's functions of pumping and dispensing fuel, recording the amount sold, and providing, in some cases, convenient credit or debit card payment options. Often, these latter features have been add-ons to pre-existing dispenser designs, with the result that the dispenser interior may have extensive wiring and cabling for power and control signals, which promotes the possibility of various errors occurring. Usually, a single microprocessor has primary dispenser control, as seen in dispenser 10 in FIG. 1. Cabling and wiring emanates from a central microprocessor 26. The central microprocessor 26 may be of the model known as Z80.

Many modem dispensers can be approached from two sides, each by a customer fueling his or her vehicle, so dispensers include side A and side B capabilities to service these customers. The wiring and cable emanating from the microprocessor 26 includes hardware I/O cable 13 leading to side A main display 12 and its associated price posting units 14. The hardware I/O line 13 also leads to side B main display 16 and its price posting units 18. Power to the microprocessor 26 is obtained through an AC input 20 fed through a power supply 22 and a main regulator 24 to provided a regulated DC supply along line 28.

Some dispensers have a programmable pump preset, which turns the pump off after a certain amount of fuel has been dispensed. In dispensers of this type, a preset 30, often a Z80 microprocessor, has a serial interface 32 to the microprocessor 26.

The microprocessor 26 also receives data along the hardware I/O line 34 from a manager keypad 36. The manager keypad is a small keyboard located inside the electronics portion of the dispenser. It is used for pump programming and certain diagnostic functions. Access to this keypad is restricted to authorized personnel via a locked door and provides up to three levels of security codes. Accordingly, the information communicated along line 34 can be quite complex.

The microprocessor 26 also receives data from the hardware I/O line 42 from a hydraulic interface 40 which, in turn, has wiring and cabling to a number of spaced-apart units 38 including pump handles, submerged turbine pumps, valves and the pulsers of the dispenser. The pump handles are the units on the outside of the dispenser on which nozzles usually rest and which are raised by the customer to indicate that fuel is to be dispensed. The submerged turbine pumps are located, typically, in underground storage tanks at the end of a supply conduits and actually provides the function of forcing the fuel to be dispensed through the supply conduits and the dispenser. The various valves involved control the flow of the liquid as required. Pulsers are known units in fuel dispensers. Pulsers are connected to meters which are forced to rotate by the flowing fuel. The rotation of the meter drives the pulser to output electrical pulses corresponding to the volume of liquid being dispensed. Typically, each pulse represents one/one-thousandths of a gallon. The foregoing description applies to the multi-product dispensers, which are now commonplace. Not shown in FIG. 1 is the possibility of a different hydraulic interface 40 and series of pumps and valves 38. If the dispenser is a blending dispenser such as is shown in U.S. Pat. No. 5,029,100 to Young et al.; U.S. Pat. No. 4,876,653 to McSpadden et al.; or U.S. Pat. No. 4,978,029 to Furrow et al., all owned by Gilbarco, the assignee of this application, a different control configuration to cause different grades of fuel to be blended as they are dispersed will be desired. The entire disclosure of these patents is incorporated herein by reference.

Also as seen in FIG. 1, the microprocessor 26 has a two-wire connection 46 to additional devices in some embodiments. Thus, as shown in FIG. 1, a side A card reader in dispenser (CRIND) logic module 44 is connected to card reader peripherals 48. The peripherals may include a card reader for reading the magnetic stripe on a credit or debit card, a printer to print receipts, a display associated with the card reading and printing process, and a note or currency acceptor for receiving currency. Other types of payment arrangements can also be used, such as the debit card arrangement disclosed in U.S. patent application Ser. No. 08/160,936, now abandoned filed Dec. 2, 1993, of Kaehler, the entire disclosure which is hereby incorporated by reference. Side B card reader logic module 50 and side B card reader peripherals 52 are also provided, similar to Side A.

Typically, the card reader logic module 44 will have communications capability over a line, such as a twisted pair 54 to a service station site controller. This is necessary in order to validate credit cards, and the like. In this regard, the communication may be encrypted, as disclosed in U.S. Pat. No. 5,228,084 of Johnson et al., entitled "Security Apparatus and System for Retail Environments", the entire disclosure of which is incorporated herein by reference. Similarly, card reader and personal identification number input devices and protocols as described in U.S. Pat. No. 4,967,366 of Kaehler entitled "Integrated Gasoline Dispenser and POS Authorization system with Unattended PIN Pad" may be used, and the disclosure of that patent is incorporated herein by reference.

The net effect, as seen in FIG. 1, is that the microprocessor 26 has numerous inputs and communication capabilities to the various components of the dispenser 10. As the central hub, the processor 26 monitors many inputs and controls many outputs. It is also responsible for many internal operation controls and calculations. This design suffers a limitation on the number and kind of feature options such as the displays, card readers and printers that can be added to and controlled by the single computing element. Also, by having each component tie back to the central processor, the number of cables required in dispensers increases, and it also adds to the level and complexity required in the microprocessor 26. This is further complicated by the need to supply power to the devices, such additional power supply wiring connections are not shown in FIG. 1.

The manufacture of such a dispenser requires careful attention to detail to properly assemble wiring harnesses and connections. The cabling is time-consuming, and errors can easily occur. Therefore, there is a need in the art for an improved dispenser electronics design to minimize the number and complexity of wiring connections.

SUMMARY OF THE INVENTION

The present invention fulfills this need in the art by providing a fuel dispenser for installation in a service station equipped with a dispenser control console including a housing, a pump to pump fuel through the housing, a fuel flow meter in the housing, a switch actuable to indicate fuel is to be pumped through the housing, a display on the housing to display the amount of fuel pumped through the housing, and a dispenser control including a plurality of microcontroller nodes and a communications bus connecting the microcontroller nodes, a first node associated with the switch, pump and fuel flow meter, a second node associated with the display, and a third node associated with a data link to the dispenser control console. A user may indicate fuel is to be pumped by actuating the switch and generating a signal to the first node, with the first node activating the pump and communicating fuel amount data onto the communications bus, the second node responding to fuel amount data on the bus to display the amount of fuel pumped, and the third node generating a signal to communicate the fuel amount data to the dispenser control console.

Preferably, the communications bus is a five wire bus having two data wires, a reset wire and two power supply wires for the nodes to provide electrical power to the nodes for use by their associated components. Each of the microcontroller nodes may include a network communication port, a read only memory storing a communications protocol, a memory storing application code suitable for that node, input/output pins and a counter/timer.

In a preferred embodiment, the first node also controls a main valve. It may also control a slowdown valve. Preferably, the fuel flow meter includes a pulser that generates a pulse each time a predetermined quantity of fuel passes the meter and the first node converts the pulses to a volume of fuel datum that is communicated on the bus. The first node may also communicate a pulser fail signal on the bus if it detects failure of the pulser.

Typically, the display includes displays of price per quantity, quantity dispensed and calculated price for the quantity dispensed and the second node supplies data for each of the displays. The second node may include a calculator to calculate the price for the quantity dispensed.

Desirably, the third node is a pump state enforcer.

In a preferred embodiment, the dispenser includes a manager keypad and the third node scans and interprets messages from the manager keypad. The third node may also generate the signal to communicate the fuel amount data to the dispenser control console and output the signal over a two wire link.

The dispenser may also include a card reader for reading payment cards and a node associated with the card reader and communicating card data onto the communications bus. In such an embodiment, preferably the third node communicates card data to the console and receives card authorization data from the console.

The dispenser may also include a printer in the housing and a node associated with the printer to print data derived from the bus. The dispenser may also include a note acceptor in the housing and a node associated with the note acceptor and communicating accepted note data with the communications bus.

In one embodiment there are a plurality of pumps to pump different grades of fuel that are blended together, and the first node controls the plurality of pumps. In another embodiment the pump to pump fuel, fuel flow meter, and switch actuable to indicate fuel is to be pumped are provided in multiples, one of each for each grade of fuel to be dispensed, and a node like the first node is provided for each grade.

A video display may be included in the housing and a node associated with the video display, for displaying indicia pertinent to data on the communications bus.

Some fuel dispensers include active vapor recovery equipment and the invention can provide control for the active vapor recovery equipment with a node associated with the active vapor recovery equipment.

The dispenser may include an auxiliary preset and a node associated with the auxiliary preset.

The dispenser may include a temperature sensor and a node associated with the temperature sensor.

The invention also provides a fuel dispenser including a housing, a pump to pump fuel through the housing, a fuel flow meter in the housing, a switch actuable to indicate fuel is to be pumped through the housing, a display on the housing to display the amount of fuel pumped through the housing, and a dispenser control including a plurality of microcontroller nodes and a communications bus connecting the microcontroller nodes, a first node associated with the switch, pump and fuel flow meter, a second node associated with the display, and a third node associated with program control node. A user may indicate .fuel is to be pumped by actuating the switch and generating a signal to the first node, with the first node activating the pump and communicating fuel amount data onto the communications bus, the second node responding to fuel amount data on the bus to display the amount of fuel pumped, and the third node providing data traffic management and diagnostic functions.

The invention also provides a method of controlling fuel dispensers like those described above including generating a signal through one of the nodes onto the bus upon actuation of the switch, pumping fuel with the pump, communicating fuel flow data through one of the nodes onto the communications bus, reading data from the bus with a node to generate a display of the amount of fuel pumped, and providing data traffic management and diagnostic functions for the other nodes and communications bus with the control node.

The method may also include supplying electrical power to the nodes over the communications bus for use by their associated components.

In one embodiment the generating step and the communicating fuel flow data step may pass data through the same node. The method may include enforcing pump state by ensuring that proper control sequences have occurred to allow pump operation, the pump state enforcing step being performed by the control node. The reading data step may be followed by calculating the price for quantity dispensed, the calculating step being performed in the same node that generates the display of the amount of fuel pumped. In one embodiment the method includes communicating data of the amount of fuel pumped from the control node over a data link to a dispenser control console.

The method may include reading card data in a card reader in the housing, and communicating card data from the control node with a data link to a dispenser control console. The method may also include accepting cash in a cash acceptor in the housing, and communicating cash data from the control node with a data link to a dispenser control console and/or delivering transaction data to a receipt printer in the housing from the communications bus through a node and printing a receipt in the receipt printer.

The method may include delivering video display data to a video display in the housing from the communications bus through a node and displaying a video using the data.

In one embodiment the pumping step includes pumping a plurality of different grades of fuel that are subsequently blended together, and controlling the plurality of pumps with a node to achieve a desired blend. For a dispenser having a pump to pump fuel, a fuel flow meter, a switch actuable to indicate fuel is to be pumped, and node for each grade of fuel to be pumped, the method may include generating a signal through a particular node onto the bus upon actuation of the switch associated with the grade to be pumped, pumping fuel with the pump associated with the grade to be pumped, and communicating pumped fuel flow data onto the communications bus, while keeping other ones of the pumps idle.

For a dispenser having a pump to pump fuel, a fuel flow meter, a switch actuable to indicate fuel is to be pumped, active vapor recovery equipment and a node for each grade of fuel to be pumped, the method may include generating a signal through a particular node onto the bus upon actuation of the switch associated with the grade to be pumped, pumping fuel with the pump associated with the grade to be pumped, activating the active vapor recovery equipment, and communicating pumped fuel flow data onto the communications bus.

For a dispenser having liquid fuel volume temperature compensation capability, the method may include, upon occurrence of the generating step, transmitting a liquid fuel temperature signal from a temperature sensor through a node onto the communications bus and thence through another node to permit compensation of the measured volume of fuel dispensed, to account for thermal expansion or contraction of the fuel.

The invention further provides a method of controlling a fuel dispenser that has a housing, a pump to pump fuel through the housing, a fuel flow meter in the housing, a switch actuable to indicate fuel is to be pumped through the housing, a display on the housing to display the amount of fuel pumped through the housing, and a dispenser control including at least two microcontroller nodes and a communications bus connecting the microcontroller nodes, one of the nodes being associated with one of the switch, pump, fuel flow meter, display. The method includes signaling a first network variable through one of the nodes onto the bus upon actuation of the switch and storing the first network variable on another node, pumping fuel with the pump, communicating a second network variable pertaining to fuel flow from one of the nodes onto the communications bus and storing the second network variable on another node, and using the second network variable to generate a display of the amount of fuel pumped. A network variable is a data packet or data transmission over the bus between nodes.

The invention provides numerous benefits. There are reductions in materials costs in that the distributed architecture lends itself to distributed power regulation. This requires, therefore, fewer cables and connectors for the electronics assembly.

There are reduced manufacturing costs using the present invention. There are fewer cables to connect, resulting in faster assembly with fewer misconnections. The design according to the present invention eliminates the configuration jumpjacks which have previously been used on display boards. The nodes can also be programmed to have the ability to self-test each other for defects.

The software used with the present invention is of decreased complexity since it is distributed into functional modules instead of being concentrated in a central high level processor.

The invention provides scalability from low end to high end models of dispensers, with no unutilized components being packaged in any assembly.

The plurality of processors in the local operating network design can provide service technicians with increased resident diagnostic functions, therefore making it easier to service units in the field and quickening the mean time to repair.

The design also provides increased packaging flexibility of the components in a dispenser. The nodes can be placed on or next to the devices which they control.

The invention also permits easy add-ons, including the possibility of automatic reconfigurations as options are added. The invention also provides the ability to add future options easily, including options not contemplated at the time of original manufacture.

Also, the modular aspect of the local operating network permits the design to be refined for different needs, including the needs of different standards in different countries.

BRIEF DESCRIPTION OF THE DRAWINGS

The invention will be better understood after a reading of the Detailed Description of the Preferred Embodiments and a review of the drawings in which.

DETAILED DESCRIPTION OF THE PREFERRED EMBODIMENTS

Figure 1:
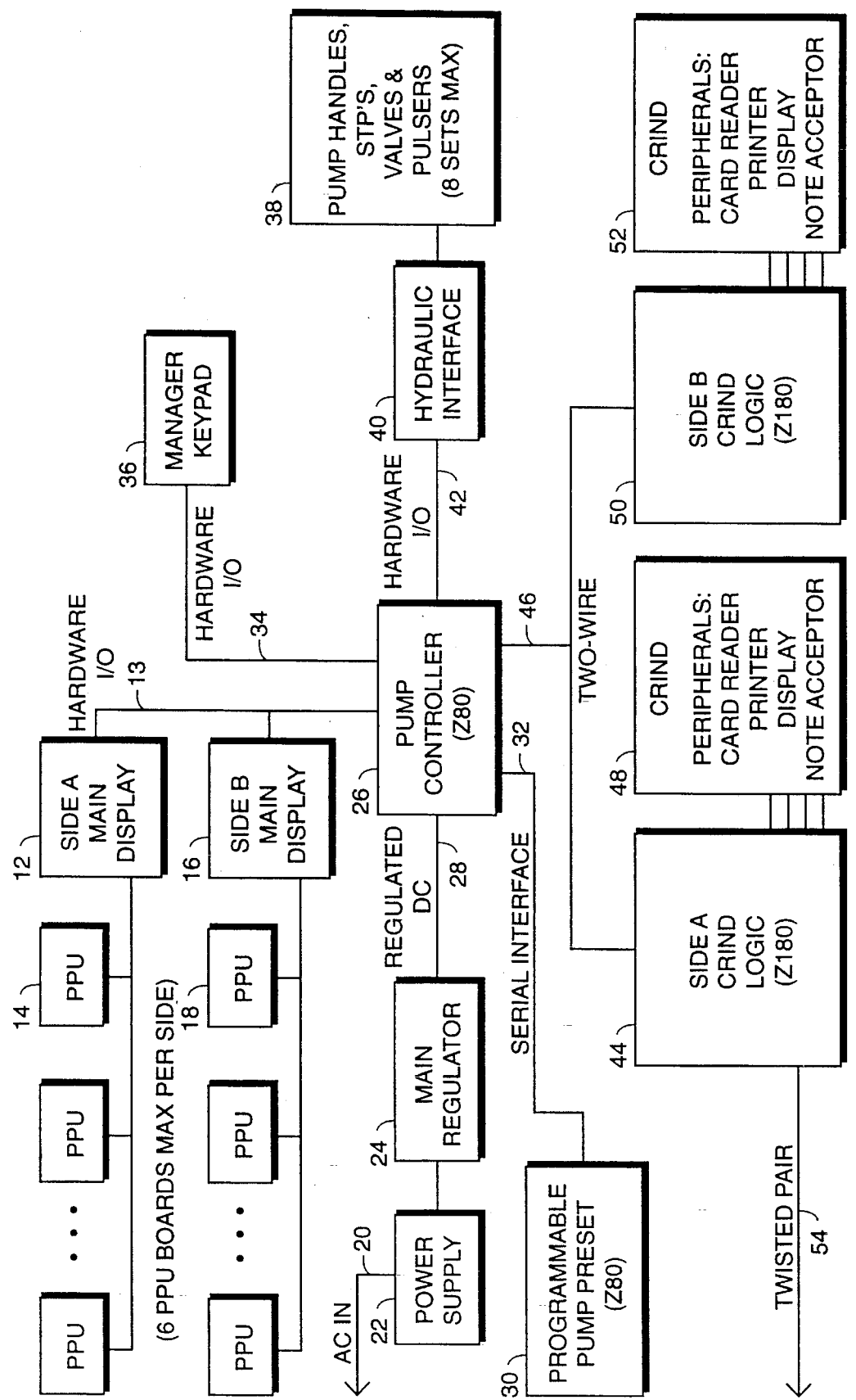
FIG. 1 is a block diagram of a prior art fuel dispenser using a hub-and-spoke control configuration.

In contrast to the central, controlling microprocessor used in the dispenser depicted in FIG. 1, the present invention provides distributed processing with multiple microprocessor nodes. A preferred embodiment uses serial protocol and hardware and software made available by Echelon Corporation, 4015 Miranda Ave., Palo Alto, Calif. 94304. The various components available from Echelon Corporation usable in connection with the invention and in establishment of the preferred embodiment are a neuron 3120 chip, a neuron 3150 chip, a LonBus communications bus and a LonTalk protocol for networking the chips together.

Additional information concerning the Echelon system is available in the following U.S. patents and PCT patent publications of Echelon:

| Pat. No. | Title |
|---|---|
| | Protocol Patents |
| 4,941,143 | Protocol for Network Having a Plurality of Intelligent Cells |
| 4,947,484 | Protocol for Network Having a Plurality of Intelligent Cells |
| 4,955,018 | Protocol for Network Having a Plurality of Intelligent Cells |
| 4,969,146 | Protocol for Network Having a Plurality of Intelligent Cells |
| 4,018,138 | Protocol for Network Having a Plurality of Intelligent Cells |
| WO 92/010041 | Multi Access Carrier Sensing Network Communication Protocol with Priority Messages |
| 5,249,270 | Development System Protocol |
| 5,297,143 | Network Communication Protocol Including a Reliable Multi Casting Technique |
| | Neuron Chip Programming Language, Binder and Network Variables |
| WO 92/16905 | Programming Language Structures for Use in a Network for Communicating, Sensing and Controlling Information |
| WO 92/16904 | Binder Interface Structure |
| WO 92/16895 | Network Variables |
| | Network Collision Detection Technology |
| WO 93/06670 | Methods and Apparatus for Preventing Unnecessary Retransmission of Messages in a Network Messaging System |
| | Neuron Chip Transceiver Interface |
| 5,182,746 | Transceiver Interface |
| | Local Operating Network Technology |
| 4,918,690 | Network and Intelligent Cell for Providing Sensing, Bidirectional Communications and Control |
| 4,939,728 | Network and Intelligent Cell for Providing Sensing, Bidirectional Communications and Control |
| 4,969,147 | Network and Intelligent Cell for Providing Sensing, Bidirectional Communications and Control |
| 5,034,882 | Multiprocessor Intelligent Cell for a Network which Provides Sensing, Multi-directional Communications and Control |
| 5,113,498 | Input/Output Section for an Intelligent Cell Which Provides Sensing, Bidirectional Communications and Control |

The disclosures of the foregoing Echelon patents are incorporated herein by reference. Access to these publications as well as other information publicly available from Echelon Corporation should enable those of ordinary skill in the art to make and use a network system, following the description set forth herein for achieving desired functionalities.

The local operating network is used to combine the various functional units of the dispenser in a distributed, rather than central, architecture. The system is made up of a plurality of microcontrollers which form network nodes. Each node is dedicated to a simple task. Communications between the various nodes are via message packets called network variables. The invention makes possible an open architecture, in which various functional units can be combined as desired to make a specific desired dispenser configuration merely by adding or deleting a dispenser element and its associated control node, and connecting the node to the communications bus. The communications bus provides power supply to the various nodes, as well as data and program updates, so that separate power supply wiring is not required.

Figure 2:
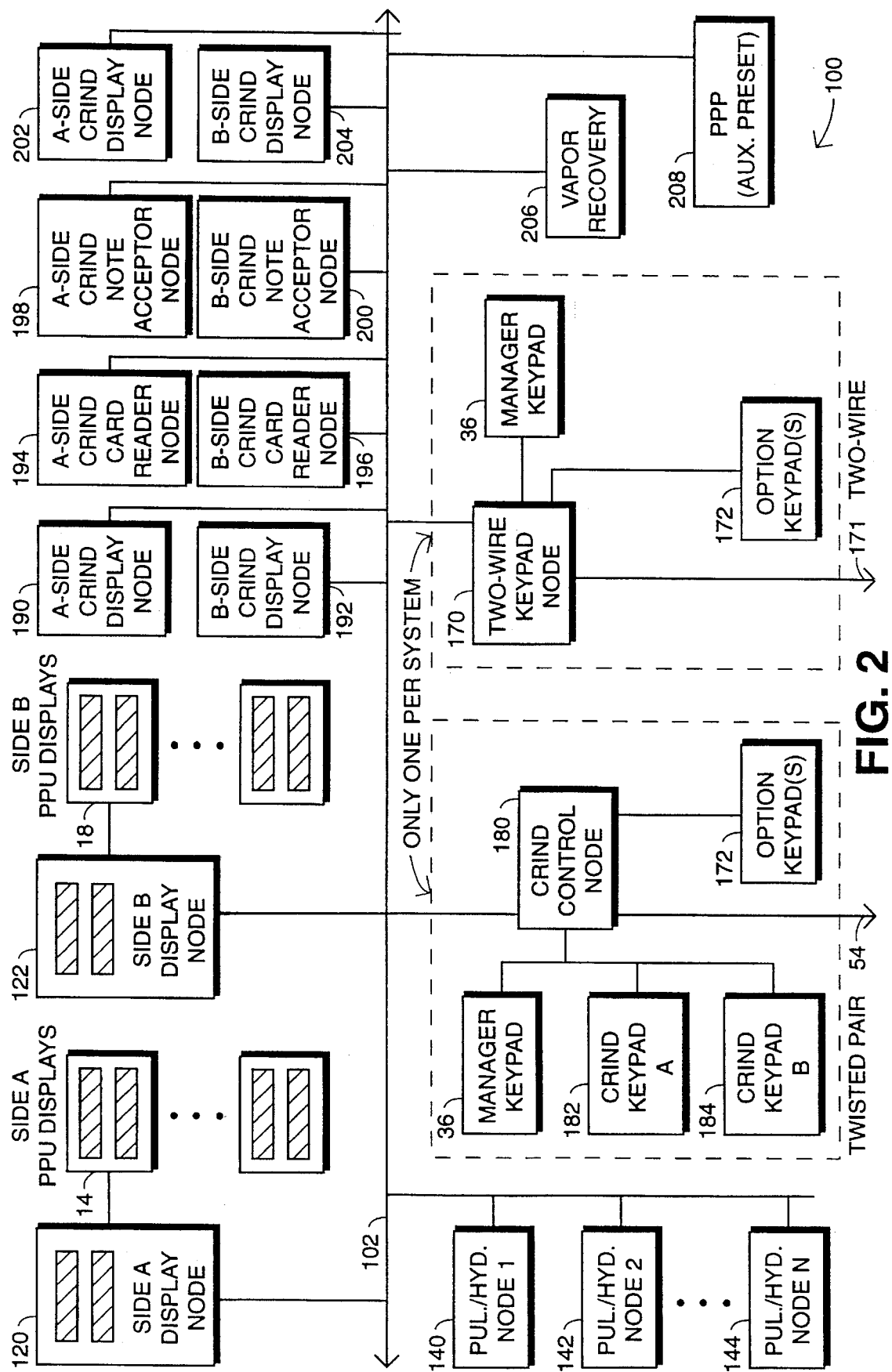
FIG. 2 is a block diagram of an embodiment of the fuel dispenser of the present invention showing various ones of the options that can be added as desired.

FIG. 2 shows a functional block diagram of the architecture for a multi-product dispenser, either with or without the card reader in dispenser (CRIND) functionality. As seen in FIG. 2, the communications bus 102 has various nodes connected to it by the node connections described by Echelon in its product literature. Thus, a side A display node 120 is connected, having its associated price posting unit displays 14, the same as the price posting units of FIG. 1. Similarly, the side B display node 122 has PPU displays 18. The bus 102 also has connected an A side card reader display 190 and a B side card reader display node 192, an A side card reader node 194 and a B side card reader node 196, an A side note acceptor node 198 and a B side note acceptor node 200, and an A side printer node 202 and a B side printer node 204. The CRIND display node 190 may, if desired, be a video display or a single- or multi-line display.

The communications bus 102 is a five-wire bus having two data wires, a reset wire and two power supply wires for the nodes. Other possibilities such as a two-wire bus that achieves power and communications objectives can be used. The power supply wires provide electrical power to the nodes for use by their associated functional components. Each microcontroller node includes a network communication port, a read-only memory storing a communications protocol, a memory-storing application code suitable for that node, and input/output pins and counter/timers.

The communication bus 102 also has connected to it three separate pulser/hydraulic nodes 140,142,144. The number of these nodes can vary depending on the number of grades of fuel the dispenser is to be capable of dispensing. A vapor recovery node 206 and an auxiliary preset node 208 can also be provided.

The dispenser 100 also has either a two-wire keypad node 170 or a card reader control node 180, but both are not required. Both are shown in FIG. 2 for the sake of making it clear that either can be provided. The fact that only one of the two is needed is indicated by surrounding each by a dotted line. If the two-wire keypad node 170 is used, it receives the signals from manager keypad 36 and any optional keypads 172. It communicates with a site controller over a two-wire connection 171. If the two-wire keypad 170 is used, then the nodes 190, 192, 194, 196, 198,200,202,204 are less likely to be desirable and are likely omitted.

If the card reader control node 180 is used, it receives the signals from the manager keypad 36 and any optional keypads 172, along with any keypads 182,184 specifically provided for operating the card reader. These are supplied, for example, to permit a customer to select options of prices, other purchase choices, or the like.

The functionality achieved in the dispenser of FIG. 2 can be achieved in various configurations of nodes. The minimum required for an effective fuel dispenser is at least one pulser hydraulic node such as node 140, at least one display 120 and one or the other of card reader control node 180 or two-wire keypad node 170. The printer node 202 may, as is conventional, be used to print receipts for customers, and the like.

Additional functionalities can be very easily added by retrofitting the dispenser to add the functioning component (e.g., a note acceptor) and adding associated microchip nodes to the communications bus 102. In addition, there may be some software changes to the pre-existing nodes to accommodate the added note acceptor. These can be communicated from the console controller over twisted pair 54 or the manager keypad 36 or a Maintenance/Diagnostic node temporarily installed for this purpose. Similarly, in making up a new dispenser, the assembly is much simpler since the local operating network communications bus 102 can be provided in a housing, with the necessary components added as needed in a configuration as required by a customer.

Figure 3:
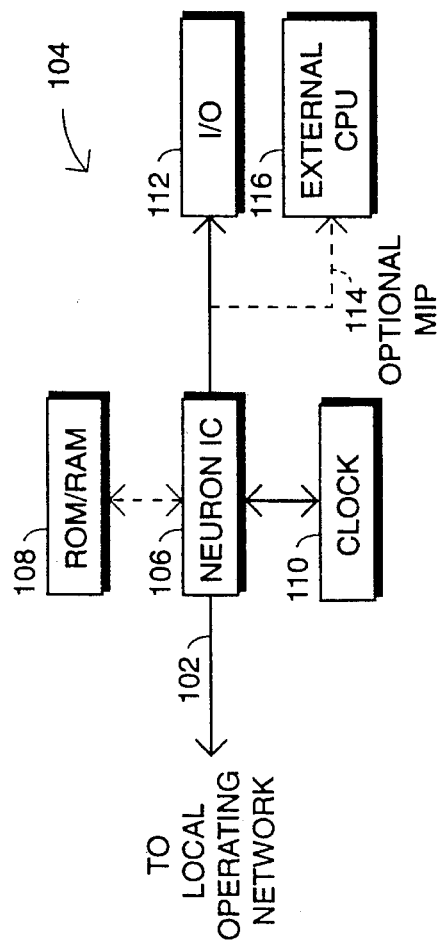
FIG. 3 is a block diagram of the electronic components of a typical node used in the invention.

Turning now to FIG. 3, details of the electronic components of a typical node 104 are shown. The communications bus 102 has connected to it the neuron chip 106. In some cases, it is desirable to have a ROM/RAM memory 108 available to supply additional data or program for the chip 106. A clock 110 is provided to provide clock pulses to the chip 106. The chip 106 also has an input/output interface 112 to the functioning components of dispenser associated with that node. In some cases, there is also an external CPU 116 connected by an optional microprocessor interface program, such as the MIP program sold by Echelon (hereinafter "MIP") 114 to the neuron chip 106. The MIP software provides a high level user interface between the neuron 106 and the microprocessor 116. The microprocessor 116 may be a Z80, 68000, etc. The MIP's purpose is to allow the exchange of control information between the neurons and the external processor.

The chip 106 is preferably an Echelon neuron chip, which comes in two versions—Model 3120 and 3150. Each of these chips is available from both Motorola, Inc. and Toshiba Electronics Corporation. The neuron chip has a 1.25 megabits per second data rate, so that the serial signal on the two-wire data lines can be fast enough to take care of any needed data or command exchanges.

The neuron 3120 chip has a network communication port, 10 kilobytes of preprogrammed ROM, which provides neuron firmware and communications, 512 bytes of EEPROM for user application code, one kilobyte of RAM for node communications and applications data, eleven software configurable input/output pins, and two 16 bit counter timers.

The neuron 3150 chip has a network communications port. It has no on-chip RAM, but it does have an external memory bus available to be attached to ROM and RAM, providing a total of 64 kilobytes of total memory. The chip itself has 42 kilobytes of user application code space, 2 kilobytes RAM for node communications and applications data, 11 software configurable I/O pins and two 16 bit counter/timers.

The Echelon communications protocol is built into these neuron chips. It is a 7-layer protocol and uses network variables. The protocol includes message services as follows: acknowledged service, request/response, unacknowledged repeated, unacknowledged and authenticated message service. The Echelon software is a C-like language with extensions, including the network variable types. There are at least 5 input/output models supported in the software library published by Echelon. Message exchanges are accomplished using binding. The binder is software that initializes all the communications parameters of the neuron chip. Network variables are constructs that the Echelon language provides in a protocol to move data on the network.

Figure 4:
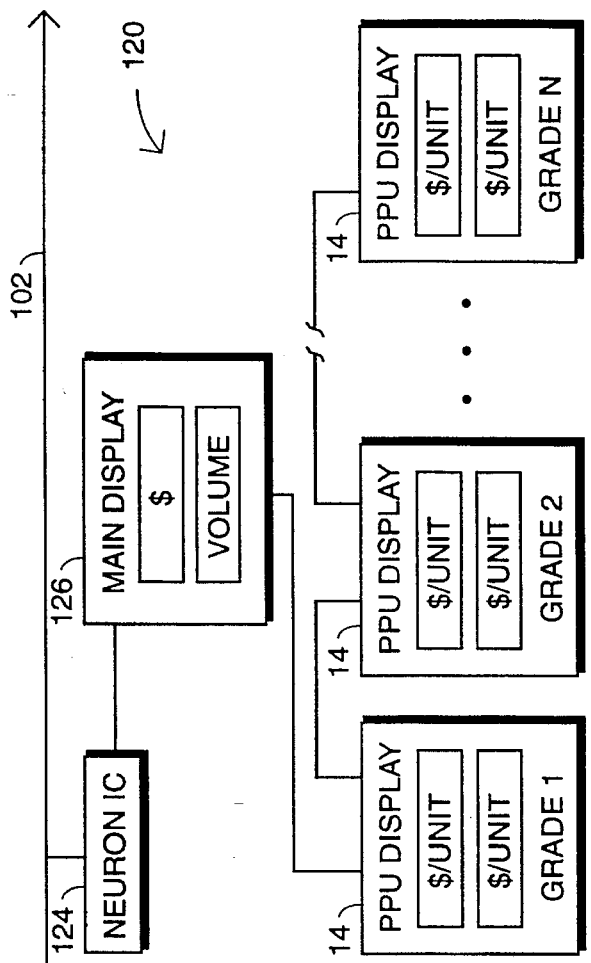
FIG. 4 is a functional block diagram of the components of a display node.

FIG. 4 is a more detailed functional block diagram of the components associated with the display node 124. The display node 124 includes the neuron chip 124 having a data link to a main display 126, which in turn is linked to the PPU displays 14. One display node per side is required according to a preferred embodiment. The neuron chip 124 can be incorporated on a main display board for the dispenser and is shown so consolidated in FIG. 2. The chip 124 drives the PPU board 14 and also performs transaction calculations to display the amount sold and the associated dollar value on the display 126. Each PPU could be a separate node in another embodiment.

Figure 5:
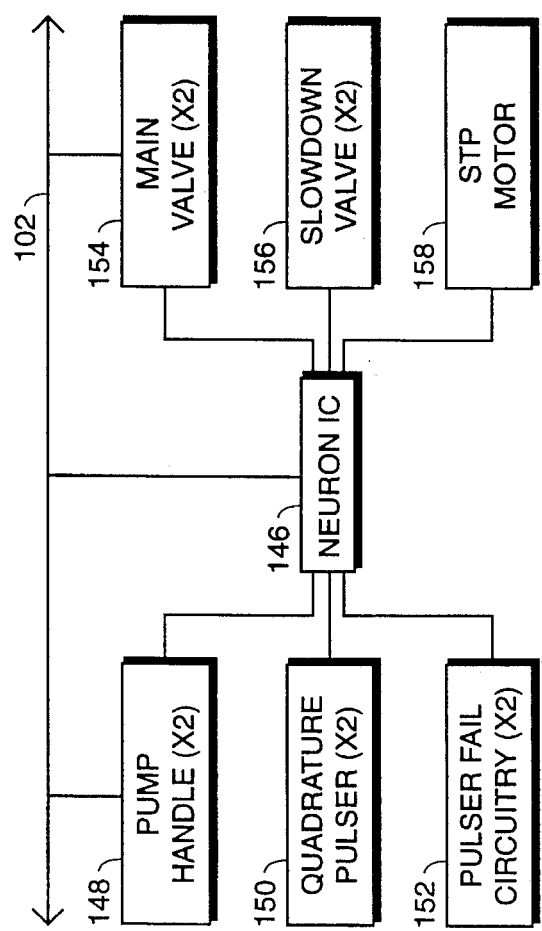
FIG. 5 is a functional block diagram of the components of a pulser/hydraulic node.

FIG. 5 shows the components of the pulser hydraulic node 140. These include neuron chip 146 associated with its peripheral functioning units. For a typical two-sided dispenser, there will be two pump handles 148, two quadrature pulsers 150, two pulser fail circuitry signal units 152, two main valves 154, two slow-down valves 156, and an STP motor 158 associated with each grade of fuel, assuming installation in a multi-product dispenser. Thus, one node is provided per each two pulsers. The chip 146 receives signals from the pump handle 148 and output signals on communications bus 102 to indicate that the pump handle has been lifted. That signal is used by other nodes in the dispenser, as picked up from the communications bus 102 to indicate that the dispenser is turned on. The neuron chip 146 also turns on the STP motor 158 for the grade of fuel associated with the handle that has been lifted. Typically, the STP motor pressurizes the conduit, but liquid does not flow until a valve in the dispensing nozzle is open. That causes liquid to flow, which causes the generation of output pulses from the associated quadrature pulser 150 to the neuron chip 146. This series of pulses is converted to a volume of liquid dispensed using a preset conversion factor in the neuron chip 146. Alternatively, the pulser data could be transmitted to the communications bus 102 for conversion elsewhere, such as at the display node.

Pulser fail circuitry 152, known to those of ordinary skill in the art, monitors operation of the quadrature pulser and will provide an error signal to the neuron chip 146, should an error be detected. A quadrature pulser produces two pulse trains that are 90° out of phase. This provides direction of rotation information that can be sensed. Alternatively, more conventional pulsers which provide electronic pulse trains that are 180° out of phase can be used, but direction of rotation cannot be ascertained from that type of pulser data.

The neuron chip 146 also controls the main valve 154, causing that valve to open when the pump handle 148 is lifted. In some cases, a slowdown valve 156 is employed in the dispenser. Slowdown valves 156 are known, in particular, for dispensers that pump a preset value of fuel, with the valve restricting the flow of liquid toward the end of that transaction to assure that the amount dispensed does not overshoot the dispensed fuel amount appropriate for the preset value.

As noted, the preferred embodiment discloses the pulser hydraulic chip 146 as controlling various functioning dispenser components. If desired, the local operating network could be configured to have separate nodes for each of those components.

Figure 6:
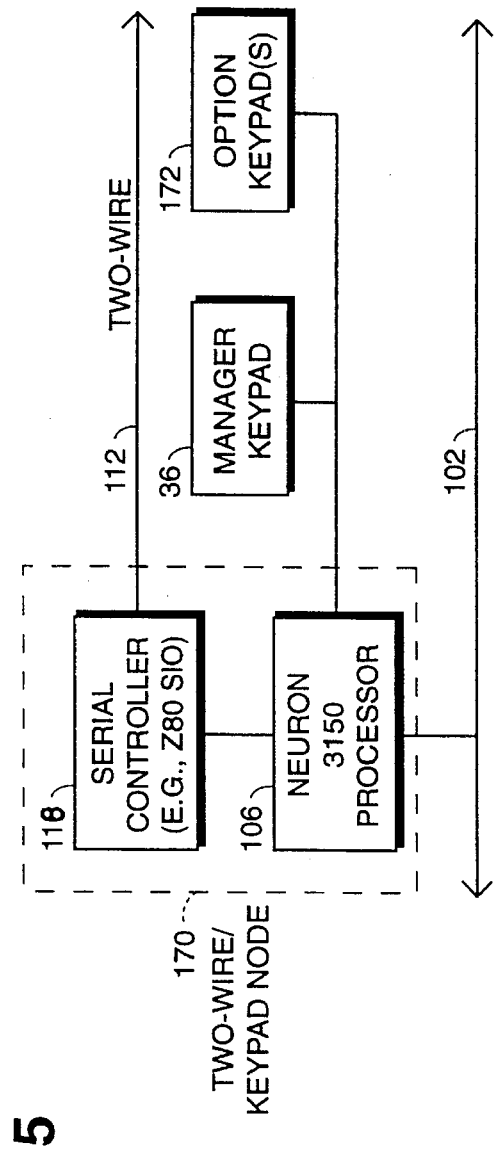
FIG. 6 is a functional block diagram of the components of a two-wire-keypad node.

FIG. 6 shows the structure of the two-wire/keypad node 170. As noted above, the two-wire keypad node 170 is used in lieu of the card reader node 180 when card reader capability is not required. The two-wire keypad 170 is connected to the communications bus 102 and includes a neuron processor 106 similar to the 3150 chip described above. The neuron processor receives data from the manager keypad 36 and the optional keypad 172, which might be added to the system. The neuron processor 106 also is connected to a serial controller 118 such as a UART which, in turn, communicates over two-wire communication line 112 to a site controller. Only one of the two-wire keypad nodes 170 is required for each dispenser, since it is capable of performing needed roles for each side of the dispenser.

The two-wire keypad node acts as a pump state enforcer, scans and interprets the manager keypad 36 and handles pump/console communications. As the pump state enforcer, it ensures that the proper control sequences for the pump dispenser have occurred to allow pump operation. That is, the pump state is a term used to indicate the condition that the pump is in, such as idle, pumping, etc. These states are arrived at by a certain control sequences, and the two-wire keypad node assures that the proper control sequence has occurred to allow pump operation. In scanning and interpreting the manager keypad, the two-wire keypad node electronically reads any data being supplied to the system over the keypad 36. This data might take the form of input data or, more commonly, perhaps assuming control of the operation of the dispenser or updating program options.

The two-wire keypad 170 also provides through its serial controller a UART functionality for external serial communications. UART is an acronym for Universal Asynchronous Receiver Transmitter, which is a silicon chip that handles the transmission and reception of serial data.

If desired, the dispenser can be made in a stand-alone version, in which case the two-wire keypad node 170 would not need to have the two-wire communication line 112 to the site controller.

Figure 7:
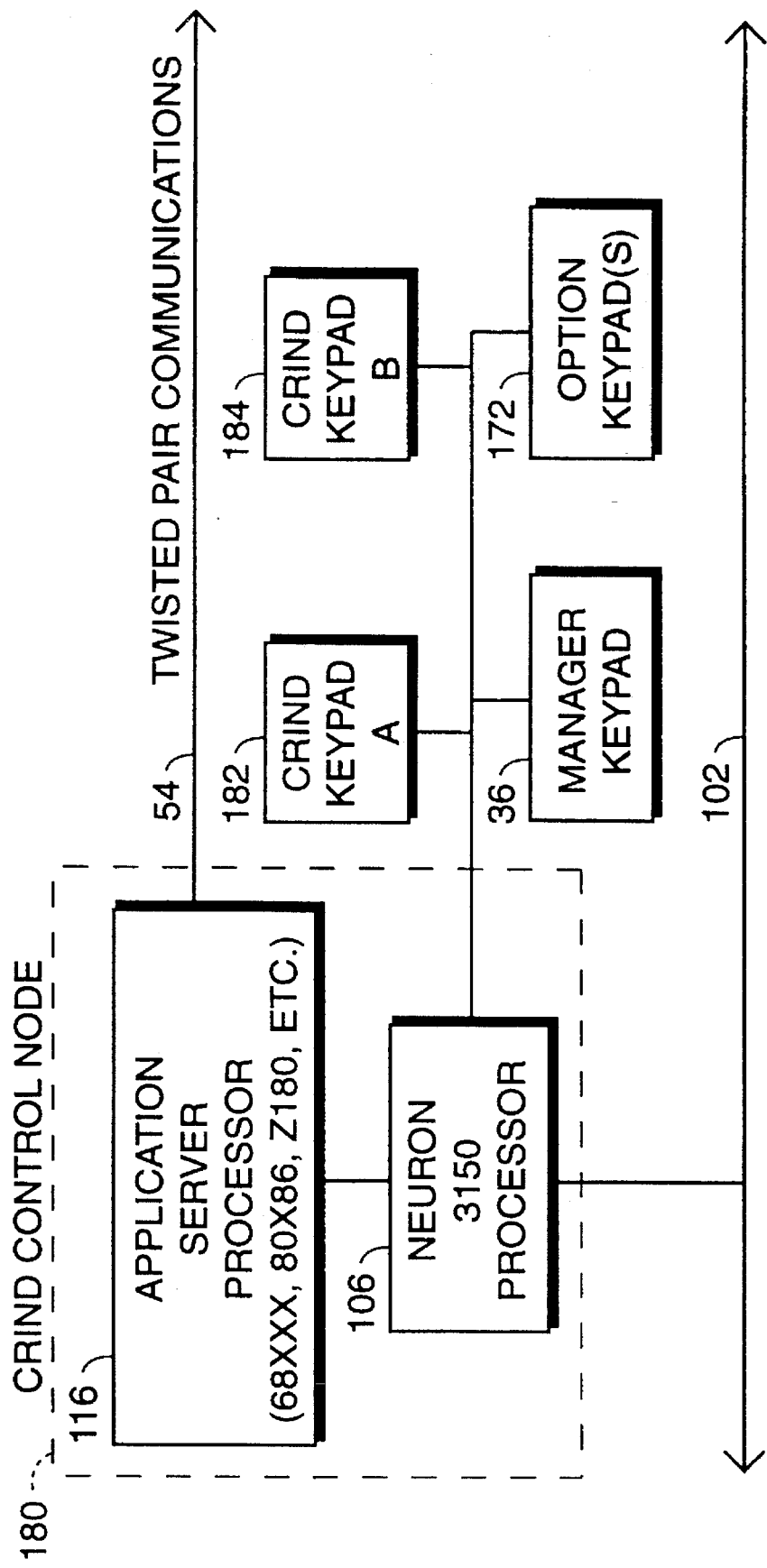
FIG. 7 is a functional block diagram of the components of a card reader node.

Turning now to FIG. 7, the structure of a CRIND control node 180 is described. The CRIND control node controls the card reader options and uses the Echelon neuron 3150 microprocessor 106. It also has associated an application server processor 116, which is a higher level microprocessor, such as those of the class of 68xxx, 80x86, or Z180. The application server processor also has a twisted pair connection 54 to the site controller. The communications over line 54 preferably use known Gilbarco protocols for transmitting and receiving credit card numbers, credit card authorization, and dollar amounts, and other information necessary for transmission between the dispenser and a site controller in accordance with conventional protocols. If desired, the apparatus disclosed in pending U.S. patent application Ser. No. 08/237,148, filed May 3, 1994 to Long et al., may be used as the line 54. The processor 106 is connected to keypads 182, 184 servicing dispenser side A and dispenser side B respectively. From the keypads, customers may indicate selections to the dispenser, such as what type of credit card to pay with, whether credit or cash or debit transaction is required, or if any other selection, such as, for example, the selections for car wash purchases described in U.S. patent application Ser. No. 08/271,553 now U.S. Pat. No. 5,493,315 filed Jul. 7, 1994, of Atchley, the entire disclosure of which is incorporated herein by reference. Also the card reader technologies described in the patents identified above in connection with the discussion of FIG. 1 may be used.

The neuron processor 106 receives data from the manager keypad 36 and any other additional optional keypads 172, which may be provided. The processor 106 receives and provides data onto the bus 102 and receives and provides data to the application server processor 116 according to software embedded in each.

As an example of the way the Echelon hardware and software are interfaced with a fuel dispenser, more details of the operation of the CRIND control node 180 is seen, in connection with the following description of FIGS. 8–12. The application processor 116 has three areas 220, 222, 224, speaking figuratively, for operation of the CRIND control node 180. Area 220 provides application control for side A of the dispenser.

Area 222 of the application processor 116 provides application processor control for the side B of the dispenser. Area 224 provides BIOS for the two areas 220,222 as well as connection to the twisted pair 54 and connection to the neuron chip 106. Chip 106 which provides message interpretation and transmission to and from the application processor 116 from the communications bus 102.

Figure 8:
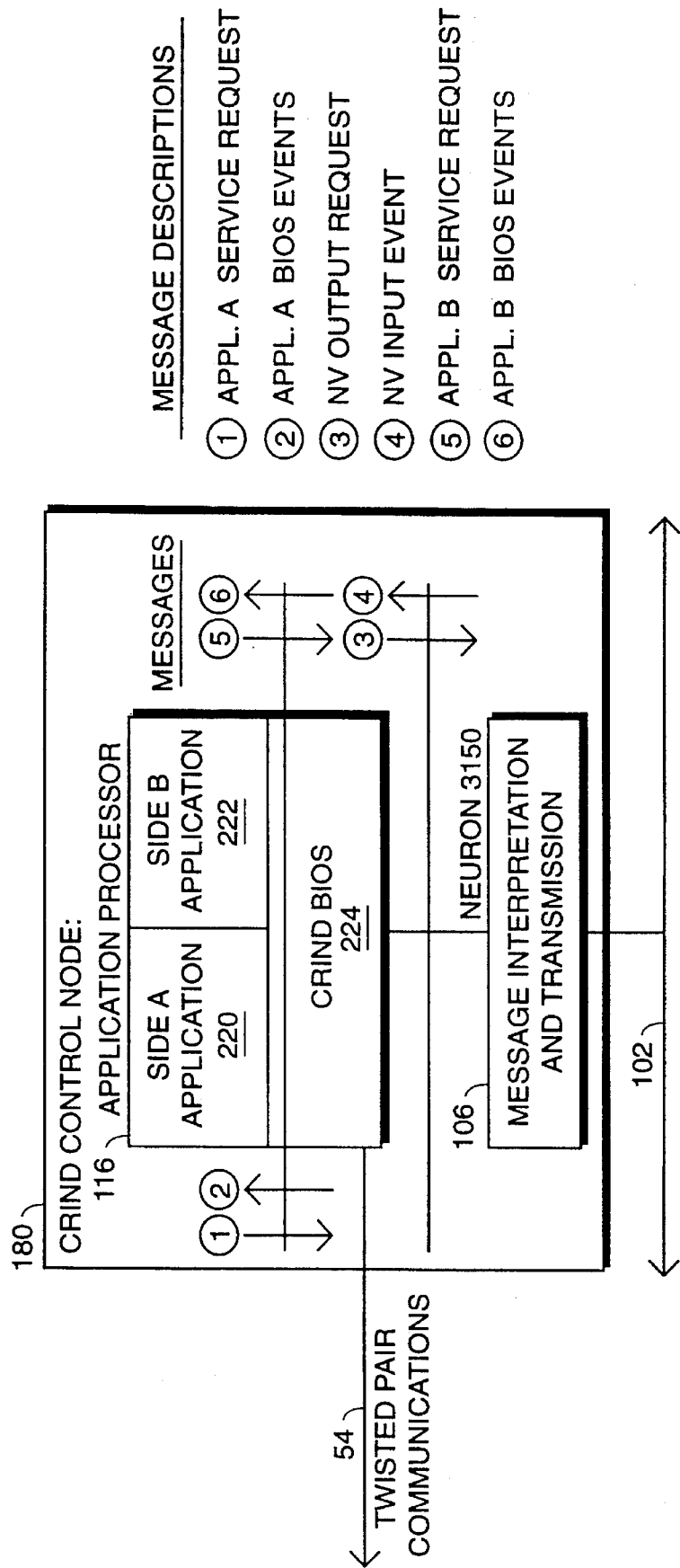
FIG. 8 is a more detailed functional block diagram of certain of the components of a card reader node.

A typical sequence of operations and communications is shown by the arrows and encircled numbers in FIG. 8. Thus, a first step might be a service request by area 220 for side A communicated to the BIOS area 224. The BIOS area 224 responds with an acknowledgement 2. Further, the BIOS 224 outputs a network variable output request 3 to the chip 106 which, in turn, provides a network variable input event 4. This is followed by a side B application service request 5 and a side B application BIOS event 6. Thus, the BIOS area 224 serves as a "traffic cop" for the sides A and B applications 220, 224 communicating with the communications bus 102 through the neuron chip 106 and also with the site controller over the twisted pair 54.

Figure 9:
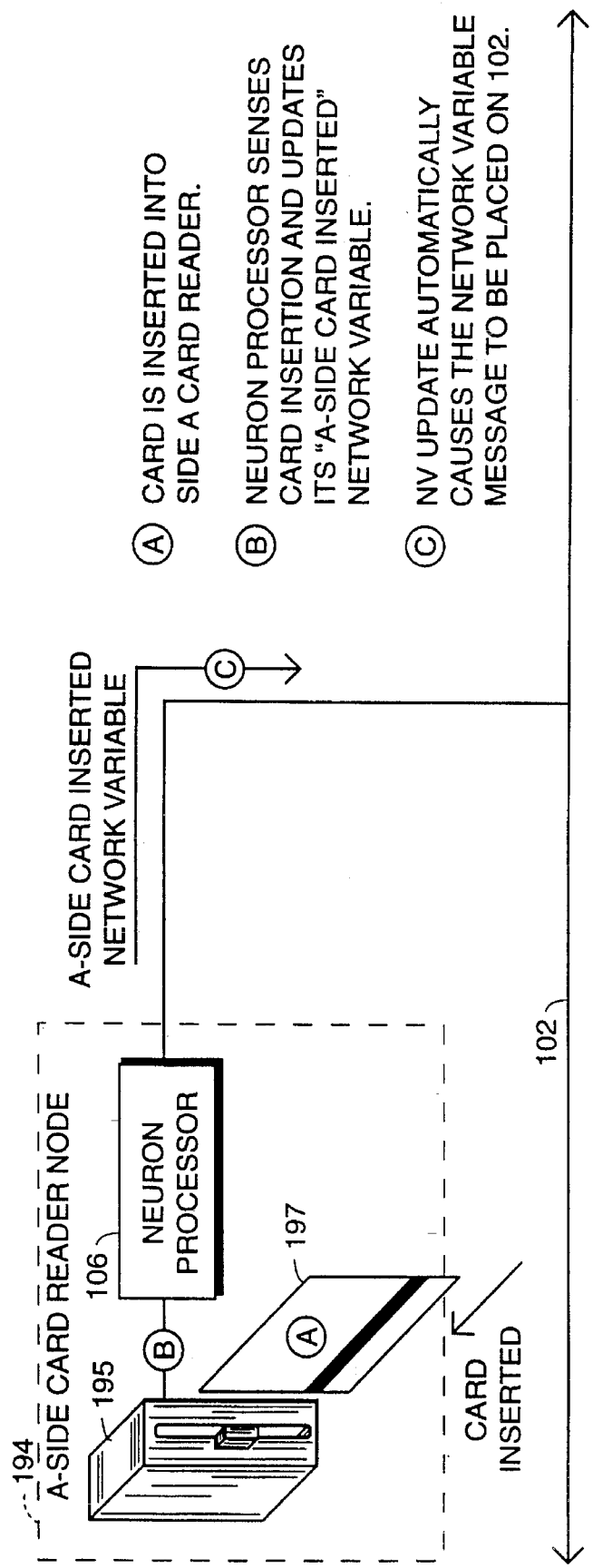
FIGS. 9–11 are diagrams showing the operation of the card reader and its node as they interface the communications bus.
Figure 10:
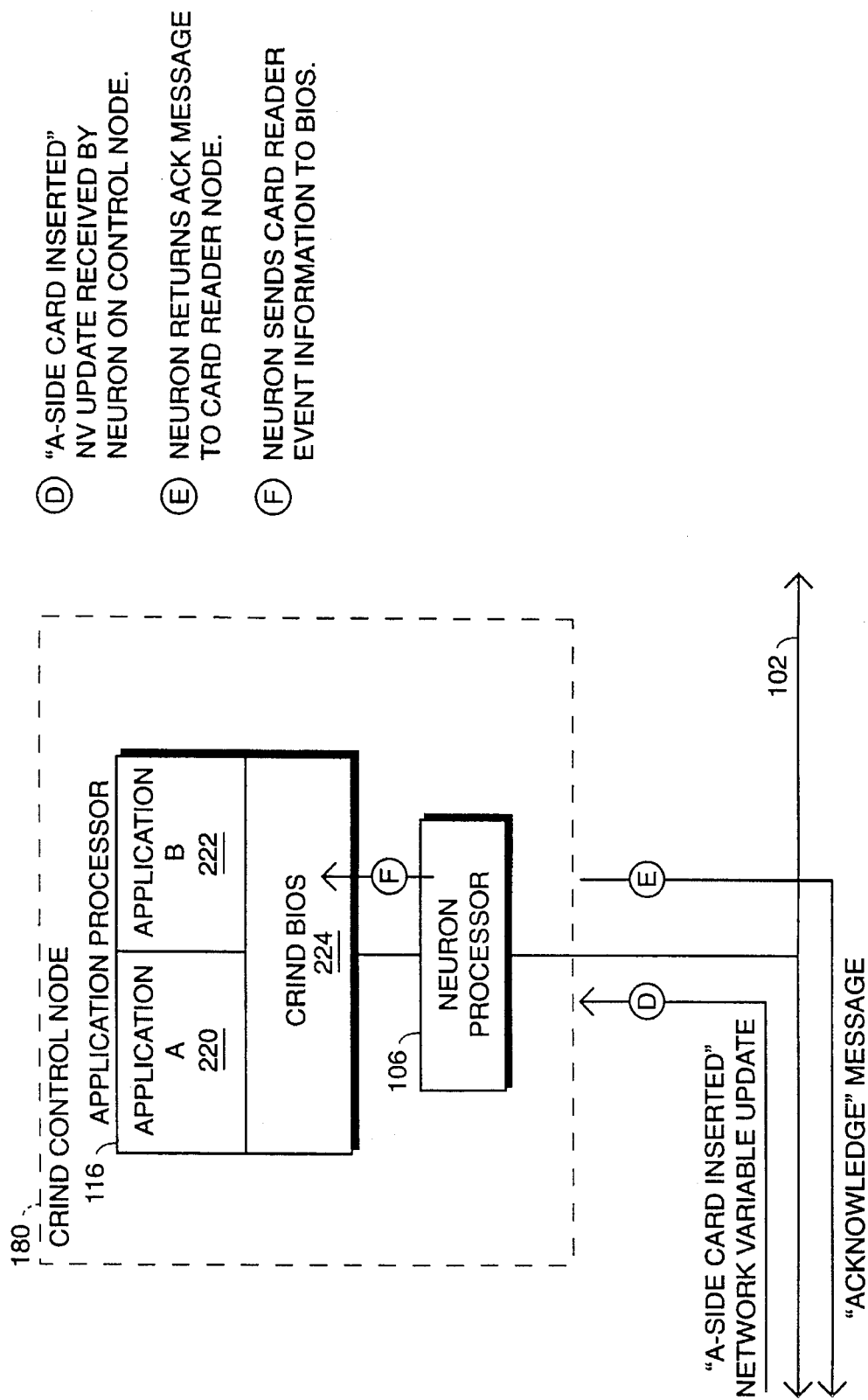
Figure 11:
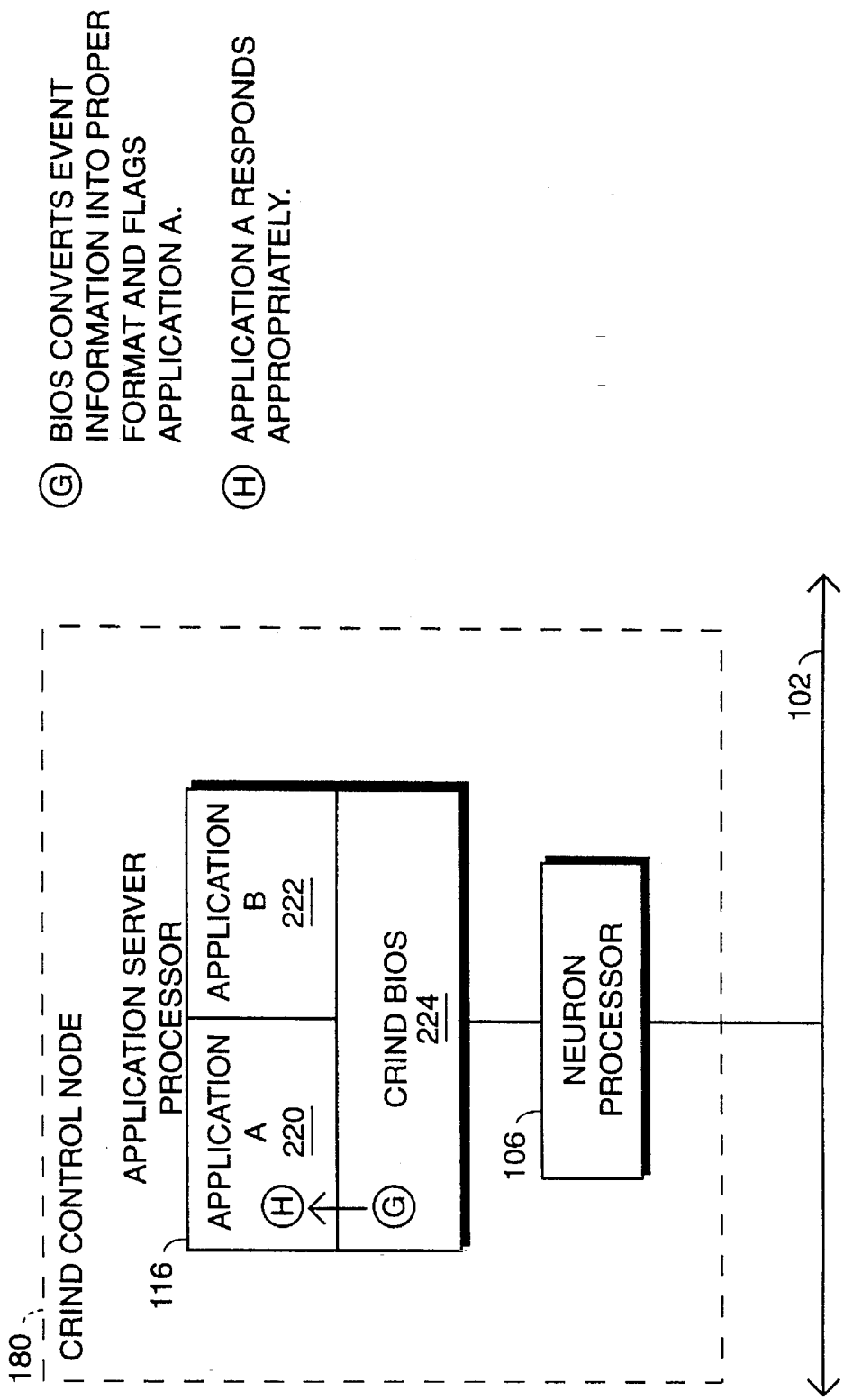

Referring now to FIGS. 9–11, a more concrete example of how these components work together will be described with reference to an A side card reader node 194 including a card reader 195 connected to a neuron processor 106. A customer inputs a card 197 into the card reader 195 at step A. At step B, the neuron processor senses card insertion and updates its "A side card inserted" network variable. The network variable update automatically causes the network variable message to be placed on the communications bus 102. The updated network variable is transmitted over the communications bus 102 and noticed by the neuron processor 106 of the CRIND control node 180 (see FIG. 10). Thus, the "A side card inserted" network variable update is received by the neuron processor 106 of the CRIND control node 180. That neuron processor 106 returns an acknowledgement message to the card reader node 194 over bus 102 and sends card reader event information into the BIOS 224. As seen in FIG. 11, the BIOS area 224 converts the event information into proper format and flag for the side A application processor 220, which can provide its own output according to the programming set forth in the side A application processor.

Figure 13:
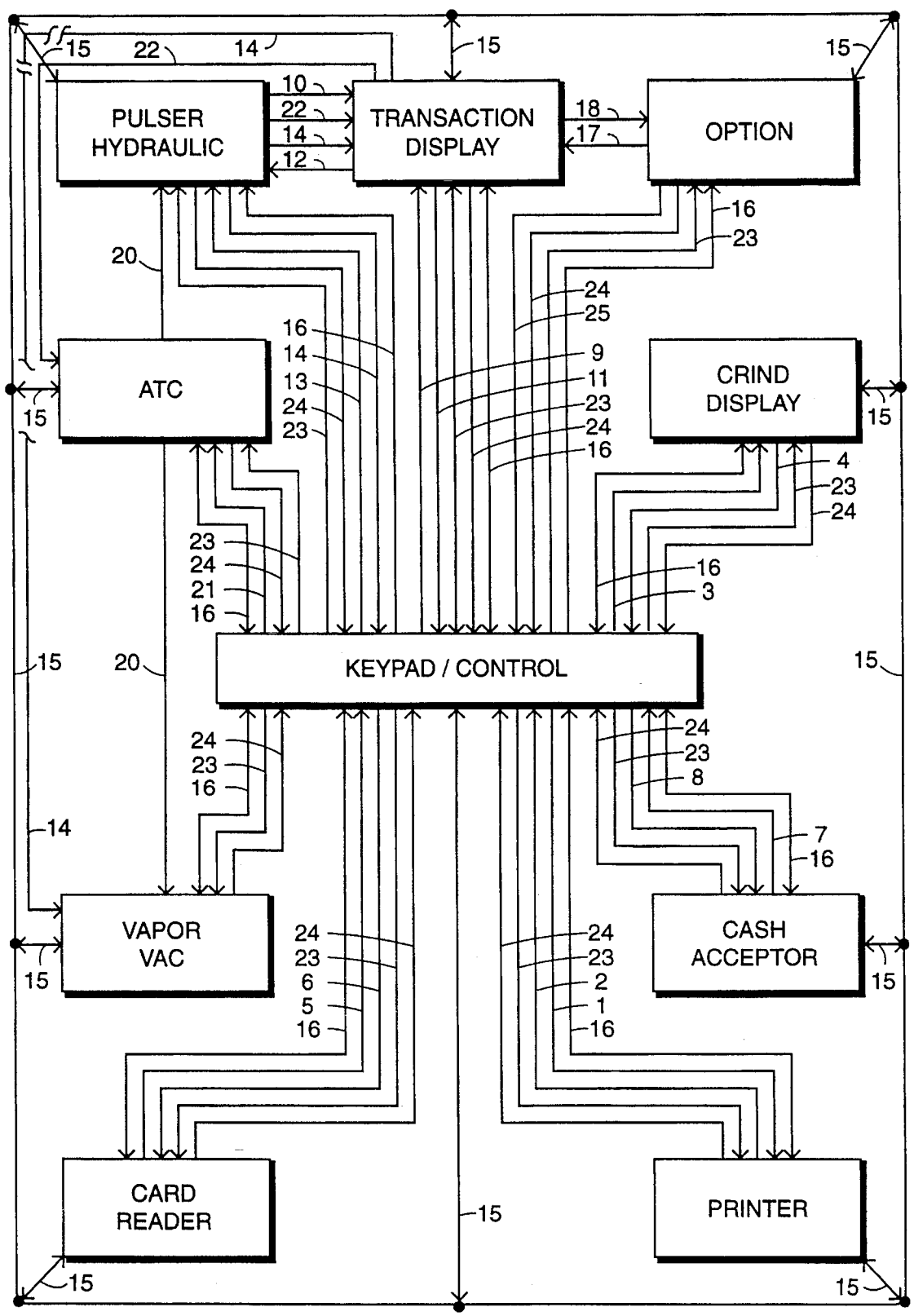
FIG. 13 is a diagram showing the types of statements that the various nodes will put on the communications bus and their intended recipients.

The various types of communications which can take place between the various nodes is set forth in the dataflow diagram attached as FIG. 13. The messages available along the numbered lines of the dataflow diagram are as follows:

| Number | From | To | Signal Name |
|---|---|---|---|
| 1 | Control | Printer | Printer Data<br>• Transaction Data<br>• Diagnostics Data |
| 2 | Printer | Control | Paper Status<br>• Paper Low<br>• Out of Paper<br>• Paper Okay |

-continued

| Number | From | To | Signal Name |
|---|---|---|---|
| | | | Printer Status<br>• Idle/Busy<br>• Jammed<br>• Top Sensor<br>• Loop Back<br>• Busy Stuck<br>Door Status<br>• Open<br>• Closed |
| 3 | Control | CRIND Display | Display Data<br>• Prompts<br>• Error Codes<br>• Advertisements<br>• Special Messages |
| 4 | CRIND Display | Control | Display Status<br>• Idle<br>• Memory Full |
| 5 | Card Reader | Control | Card Reader Data<br>• Track 1 Data<br>• Track 2 Data<br>• Security Track Data<br>Card Status<br>• Card In<br>• Card Out<br>• Valid/Invalid |
| 6 | Control | Card Reader (Motorized) | Control<br>• Reject<br>• Eject<br>• Eat<br>• Hold<br>• Release<br>Data<br>• Write to Track 1<br>• Write to Track 2<br>• Write to Smart Card |
| 7 | Cash Acceptor | Control | Status<br>• LRC In/Out A<br>• LRC In/Out B<br>• Bill In<br>• Escrow<br>• Stacked<br>• Rejected Bill<br>• Cheat Status<br>• Idle |
| 8 | Control | Cash Acceptor | Control<br>• Stack<br>• Reject<br>• Configure |
| 9 | Control | Transaction Display | • PPU Data<br>• Preset Data<br>• Volume Allocation<br>• Cash Allocation<br>• Manager Keypad Data<br>• Error Messages |
| 10 | Pulser/Hydraulic | Transaction Display | • Volume Dispensed Data |
| 11 | Transaction Display | Control | • Transaction Data Uncompensated<br>• Transaction Data Compensated<br>• Display Error Checking |
| 12 | Transaction Display | Pulser Hydraulic | • Preset Volume Goal<br>• Grad Information (Blender, SHMPD) |
| 13 | Control | Pulser Hydraulic | Conversion Factor<br>• U.S. Gallons<br>• U.S. Gallons to Imperial Gallons<br>• 1012 Pulses Per Gallon<br>Grade Assignment |
| 14 | Pulser/Hydraulic | • Transaction Display | Status<br>• Pump Handles<br>• Pulsers<br>• Valves<br>• STP/Motor<br>• Preset Goal |
| 15 | All Nodes | All Nodes | • Deauthorization |
| 16 | Control | All Nodes | • Authorization |

| Number | From | To | Signal Name |
|---|---|---|---|
| 20 | ATC | Pulser/Hydraulic VVac | • Temperature Data<br>• Volume Correction Factor (VCF) |
| 21 | Control | ATC | Configuration<br>• Fuel Types<br>• Fuel Density |
| 22 | ATC (Pulser/Hydraulic | Transaction Display | ATC Data<br>• Temp<br>• Diagnostics<br>• Compensated Volume<br>• Uncompensated Volume<br>• Fuel Type<br>• Fuel Density<br>• VCF |
| 23 | Control | All | • Diagnostics Command<br>• Power Fail |
| 24 | All | Control | • Diagnostics Status |
| 25 | Option | Control | Option Switch Data<br>• Pump Preset<br>• Cash/Credit<br>• Grade Select<br>• CRIND Keypad |

The local operating network open architecture made available by the invention provides for very versatile design capabilities in designing further dispensers. For example, although the dispenser architecture shown in FIG. 2 shows several pulser/hydraulic nodes, the number of pulser/hydraulic nodes can be quite variable, as desired. That is, multiple grades can be easily added by simply adding additional nodes to the communications bus 102 and its associated hardware. Thus, for a three-grade multi-product dispenser, six nodes are used, three pulsers/hydraulic nodes, two display nodes, and one two-wire keypad node (or CRIND control node).

The card reader capability made available by the card reader control node 180 makes available multiple options, as suggested above in connection with FIG. 2, including the possibility of providing one or more card readers, note acceptors and printers on each side of the dispenser. Furthermore, should additional functionality in the form of displays to the customer be desired, those can be added simply. For example, the displays can be full screen displays as disclosed in U.S. patent application Ser. No. 07/960,512, filed Oct. 13, 1992; now abandoned and continued as Ser. No. 08/539,505 filed Oct. 6, 1995 U.S. patent application Ser. No. 07/959,844, filed Oct. 13, 1992; now abandoned, continued as application Ser. No. 08/271,553 now U.S. Pat. No. 5,493,315 and U.S. patent application Ser. No. 07/960,515, filed Oct. 13, 1992 now U.S. Pat. No. 5,543,849. The disclosures of these applications are hereby incorporated by reference. This added flexibility makes it possible to upgrade and retrofit already-installed dispensers with only relatively easy-to-perform modifications and substitutions as required.

Figure 12:
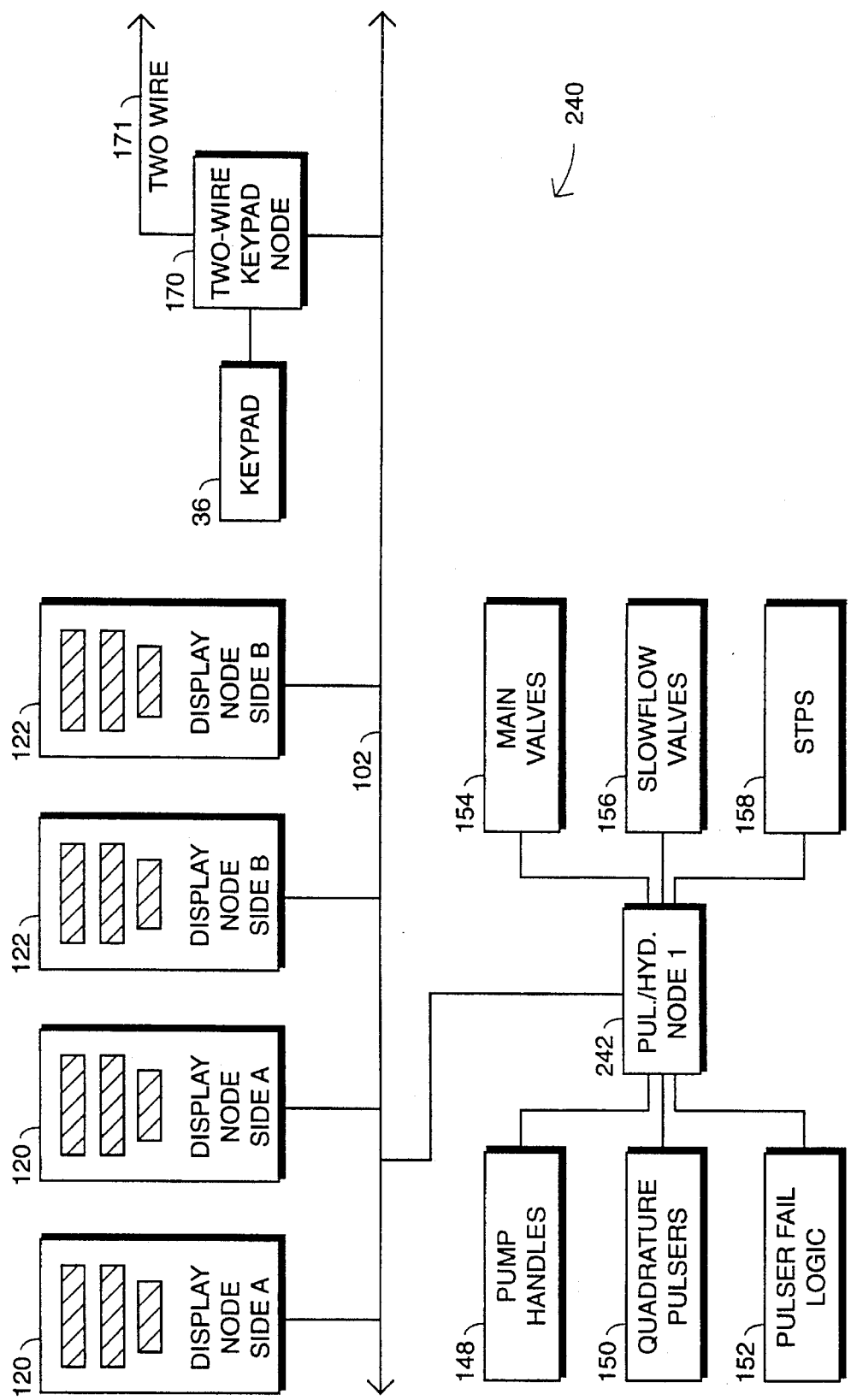
FIG. 12 is a block diagram of an embodiment of the present invention in which the fuel dispenser is a blending dispenser.

The invention can also be incorporated in a blending-type dispenser 240 shown in FIG. 12. Here a pulser hydraulic node 242 has associated pump handles 148, pulser fail logic circuitry 152, quadrature pulsers 150, main valves 154, slow-flow valves 156 and submerged turbine pumps 158. The design of the blending hardware may be as described in the U.S. patents mentioned above in connection with the description of FIG. 1. Data from the pulser hydraulic node 242 is put onto the communications bus 102 and thereby communicates with the displays 120,122 as well as two-wire keypad node 170 as described above.

The local operating network may also be used to operate a vapor recovery fuel dispenser, as suggested above in connection with item 206 of FIG. 2. The vapor recovery technology is preferably an assist-type vapor recovery as taught in U.S. Pat. No. 5,040,577 to Pope and one or more of U.S. Pat. Nos. 5,269,353 to Nanaji et al.; 5,156,199 to Hartsell et al.; 5,355,915 to Payne; 5,435,979 to Tucker et al. or U.S. patent application Ser. Nos. 08/131,313 filed Oct. 4, 1993 to Hartsell et al. now U.S. Pat. No. 5,417,256; 08/033,311 filed Mar. 15, 1993 to Hartsell, Jr. et al.; now U.S. Pat. No. 5,450,883; 08/192,669 filed Feb. 7, 1994 to Hartsell et al.; 08/294,108 filed Aug. 22, 1994 to Payne et al. now U.S. Pat. No. 5,542,458; 08/153,528 filed Nov. 16, 1993 to Nanaji et al.; now U.S. Pat. No. 5,464,466 and 08/274,302 filed Jul. 11, 1994 to Hartsell et al. now abandoned, the disclosures of which are incorporated herein by reference. Alternatively, the vapor recovery node may interface with other vapor recovery technologies such as WayneVac sold by Wayne Division of Dresser Industries, MaxVac sold by Tokheim or other assist-type systems.

The local operating network concept may also be incorporated in a temperature compensation fuel dispenser, in which data concerning the temperature of the fuel is used to correct for thermal expansion or contraction of the fuel and thereby correct at displays the value and amounts being sold, in accordance with U.S. patent application Ser. No. 08/279,174, filed Jul. 22, 1994, of Von Cannon, the entire disclosure of which is incorporated herein by reference.

The invention provides numerous benefits. There are reductions in materials costs in that the distributed architecture lends itself to distributed power regulation. This requires, therefore, fewer cables and connectors for the electronics assembly.

There are reduced manufacturing costs using the present invention. There are fewer cables to connect, resulting in faster assembly with fewer misconnections. The design according to the present invention eliminates the configuration jumpjacks which have previously been used on display boards. The nodes can also be programmed to have the ability to self-test each other for defects.

The software used with the present invention is of decreased complexity since it is distributed into functional modules instead of being concentrated in a central high level processor. This results in virtually a "one-program" pump.

The invention provides scalability from low end to high end models of dispensers, with no unutilized components being packaged in any assembly.

The plurality of processors in the local operating network design can provide service technicians with increased resident diagnostic functions, therefore making it easier to service units in the field and quickening the mean time to repair.

The design also provides increased packaging flexibility of the components in a dispenser. The nodes can be placed on or next to the devices which they control.

The invention also permits easy add-ons, including the possibility of automatic reconfigurations as options are added. The invention also provides the ability to add future options easily, including options not contemplated at the time of original manufacture.

Also, the modular aspect of the local operating network permits the design to be refined for different needs, including the needs of different standards in different countries.

Accordingly, it should be appreciated that the invention provides very broad flexibility in designing fuel dispensers taking advantage of local operating network capability. Those of ordinary skill in the art will appreciate that the invention can take different forms than those specifically described hereinabove, and the spirit and scope of the claims of this application, not the specific disclosure, will provide the measure of protection afforded.

What is claimed is:

1. A fuel dispenser for installation in a service station equipped with a dispenser control console comprising
a housing,
a pump to pump fuel through said housing,
a fuel flow meter in said housing,
a switch actuable to indicate fuel is to be pumped through said housing,
a display on said housing to display the amount of fuel pumped through said housing, and
a plurality of microcontroller nodes for dispenser control and a communications bus each said microcontroller node connected to said communications bus and including a controller to control a dispenser function, a first node associated with said switch, pump and fuel flow meter, a second node associated with said display, and a third node associated with a data link to the dispenser control console,
said microcontroller nodes communicating with others of said microcontroller nodes through said communications bus,
whereby a user may indicate fuel is to be pumped by actuating said switch and generating a signal to said first node, with said first node activating said pump and communicating fuel amount data onto said communications bus, said second node responding to fuel amount data on said bus to display the amount of fuel pumped, and said third node generating a signal to communicate the fuel amount data to the dispenser control console.

2. A fuel dispenser as claimed in claim 1 wherein said communications bus is a five wire bus having two data wires, a reset wire and two power supply wires for said nodes to provide electrical power to said nodes for use by their associated components.

3. A fuel dispenser as claimed in claim 1 wherein each of said microcontroller nodes comprise a network communication port, a read only memory storing a communications protocol, a memory storing application code suitable for that node, input/output pins and a counter/timer.

4. A fuel dispenser as claimed in claim 1 wherein said first node also controls a main valve.

5. A fuel dispenser as claimed in claim 1 wherein said first node also controls a slowdown valve.

6. A fuel dispenser as claimed in claim 1 wherein said fuel flow meter includes a pulser that generates a pulse each time a predetermined quantity of fuel passes the meter and said first node converts the pulses to a volume of fuel datum that is communicated on said bus.

7. A fuel dispenser as claimed in claim 6 wherein said first node communicates a pulser fail signal on said bus if it detects failure of said pulser.

8. A fuel dispenser as claimed in claim 1 wherein said third node is a pump state enforcer.

9. A fuel dispenser as claimed in claim 1 further comprising a manager keypad and wherein said third node scans and interprets messages from said manager keypad.

10. A fuel dispenser as claimed in claim 1 wherein said third node generates said signal to communicate the fuel amount data to the dispenser control console and outputs said signal over a two wire link.

11. A fuel dispenser as claimed in claim 1 further comprising a printer in said housing and a node associated with said printer to print data derived from said bus.

12. A fuel dispenser as claimed in claim 1 further comprising a note acceptor in said housing and a node associated with said note acceptor and communicating accepted note data with laid communications bus.

13. A fuel dispenser as claimed in claim 1 wherein there are a plurality of pumps to pump different grades of fuel that are blended together, and said first node controls said plurality of pumps.

14. A fuel dispenser as claimed in claim 1 further comprising a video display in said housing and a node associated with said video display, for displaying indicia pertinent to data on said communications bus.

15. A fuel dispenser as claimed in claim 1 wherein said pump to pump fuel, fuel flow meter, and switch actuable to indicate fuel is to be pumped are provided in multiples, one of each for each grade of fuel to be dispensed, and a node like said first node is provided for each grade.

16. A fuel dispenser as claimed in claim 1 further comprising active vapor recovery and wherein a node is associated with said active vapor recovery equipment.

17. A fuel dispenser as claimed in claim 1 further comprising an auxiliary preset and wherein a node is associated with said auxiliary preset.

18. A fuel dispenser as claimed in claim 1 further comprising a temperature sensor and wherein a node is associated with said temperature sensor.

19. A fuel dispenser as claimed in claim 1 wherein said display includes displays of price per quantity and quantity dispensed for the quantity dispensed and said second node supplies data for each of said displays.

20. A fuel dispenser as claimed in claim 19 wherein said second node includes a calculator to calculate the calculated price for the quantity dispensed and said display further includes displays of calculated price for the quantity dispensed.

21. A fuel dispenser as claimed in claim 1 further comprising a card reader for reading payment cards and a node associated with said card reader and communicating card data onto said communications bus.

22. A fuel dispenser as claimed in claim 24 wherein said third node communicates card data to said console and receives card authorization data from the console.

23. The fuel dispenser as claimed in claim 1 further comprising an additional microcontroller directly coupled to certain of said microcontroller nodes to provide a high level interface for communication with said microcontroller nodes.

24. A fuel dispenser for installation in a service station equipped with a dispenser control console comprising a housing having two sides, a pump to pump fuel through fuel lines for either of said two sides through said housing, a fuel flow meter for each fuel line in said housing, a switch associated with each fuel line actuable to indicate fuel is to be pumped through its associated fuel line, a display on each side of said housing to display the amount of fuel pumped through the line associated with that side of the housing, and a plurality of microcontroller nodes for dispenser control and a communications bus each said microcontroller node connected to said communications bus and including a controller to control a dispenser function, said microcontroller nodes including a switch node associated with the switch, pump and fuel flow meter for each side, a display node associated with each of said displays, and a data link node associated with a data link to said dispenser control console, said microcontroller nodes communicating with others of said microcontroller nodes through said communications bus, whereby a user may indicate fuel is to be pumped by actuating one of said switches and thereby generating a signal to said switch node, with said switch node activating said pump and communicating fuel amount data and switch node identification data onto said communications bus, said display node for the side actuated responding to fuel amount data on said bus to display the amount of fuel pumped on the display for the side actuated, and said third node generating a signal to communicate the fuel amount data to the dispenser control console.

25. The fuel dispenser as claimed in claim 24 further comprising an additional microcontroller directly coupled to certain of said microcontroller nodes to provide a high level interface for communication with said microcontroller nodes.

26. A fuel dispenser comprising a housing, a pump to pump fuel through said housing, a fuel flow meter in said housing, a switch actuable to indicate fuel is to be pumped through said housing, a display on said housing to display the amount of fuel pumped through said housing, and a plurality of microcontroller nodes for dispenser control and a communications bus each said microcontroller node connected to said communications bus and including a controller to control a dispenser function, a first node associated with said switch, pump and fuel flow meter, a second node associated with said display, and a third node associated with program control node, said microcontroller nodes communicating with others of said microcontroller nodes through said communications bus, whereby a user may indicate fuel is to be pumped by actuating said switch and generating a signal to said first node, with said first node activating said pump and communicating fuel amount data onto said communications bus, said second node responding to fuel amount data on said bus to display the amount of fuel pumped, and said third node providing data traffic management and diagnostic functions.

27. A fuel dispenser as claimed in claim 26 wherein said third node enforces pump state by ensuring that proper control sequences have occurred to allow pump operation.

28. The fuel dispenser as claimed in claim 26 further comprising an additional microcontroller directly coupled to certain of said microcontroller nodes to provide a high level interface for communication with said microcontroller nodes.

29. A fuel dispenser comprising a housing, a pump to pump fuel through said housing, a fuel flow meter in said housing, a switch actuable to indicate fuel is to be pumped through said housing, a display on said housing to display the amount of fuel pumped through said housing, and a plurality of microcontroller nodes for dispenser control and a communications bus each said microcontroller node connected to said communications bus of including a controller to control a dispenser function, ones of said nodes being associated with said switch, pump, fuel flow meter, display, and a control node associated with data traffic management and diagnostic functions, said microcontroller nodes communicating with others of said microcontroller nodes through said communications bus, whereby a user may indicate fuel is to be pumped by actuating said switch, thereby generating a signal to one of said nodes and communicating data onto said communications bus, resulting in the display of the amount of fuel pumped, with said control node providing data traffic management and diagnostic functions for the other nodes and communications bus.

30. A fuel dispenser comprising a housing having a plurality of fuel dispensing components therein, a plurality of microcontroller nodes for dispenser control and a communications bus each said microcontroller node connected to said communications bus and including a controller to control a dispenser function, each of said nodes associated with one of said fuel dispensing components, said microcontroller nodes communicating with others of said microcontroller nodes through said communications bus, whereby a user may dispense fuel by an act which generates a signal from a node which passes communications to other nodes over said communications bus.

31. A fuel dispenser as claimed in claim 30 wherein one of said nodes is a remote communications node for communicating with a remote site controller.

32. A method of dispensing fuel comprising providing a housing having a plurality of fuel dispensing components therein and including a plurality of microcontroller nodes and a communications bus connecting the microcontroller nodes, each of the nodes associated with one of the fuel dispensing components, and controlling functions associated with dispensing fuel using the microcontroller nodes to generate a signal from the microcontroller nodes which passes communications to other of the microcontroller nodes over the communications bus.

33. A method of controlling fuel dispenser that has a housing, a pump to pump fuel through the housing, a fuel flow meter in the housing, a switch actuable to indicate fuel is to be pumped through the housing, a display on the housing to display the amount of fuel pumped through the housing, and a a plurality of microcontroller nodes for dispenser control and a communications bus, each microcontroller node connected to the communications bus and including a controller to control a dispenser function, ones of the nodes being associated with the switch, pump, fuel flow meter, display, and a control node associated with data traffic management and diagnostic functions, the microcontroller nodes communicating with other of the said microcontroller nodes through the communications bus, comprising generating a signal through one of the nodes onto the bus upon actuation of the switch, pumping fuel with the pump, communicating fuel flow data through one of the nodes onto the communications bus, reading data from the bus with a node to generate a display of the amount of fuel pumped, and providing data traffic management and diagnostic functions for the other nodes and communications bus with the control node.

34. A method as claimed in claim 33 further comprising supplying electrical power to the nodes over the communications bus for use by their associated components.

35. A method as claimed in claim 33 wherein said generating step and said communicating fuel flow data step pass data through the same node.

36. A method as claimed in claim 33 further comprising enforcing pump state by ensuring that proper control sequences have occurred to allow pump operation, said pump state enforcing step being performed by the control node.

37. A method as claimed in claim 33 wherein the reading data step is followed by calculating the price for quantity dispensed, said calculating step being performed in the same node that generates the display of the amount of fuel pumped.

38. A method as claimed in claim 33 further comprising communicating data of the amount of fuel pumped from the control node over a data link to a dispenser control console.

39. A method as claimed in claim 33 further comprising reading card data from a card reader in the housing, and communicating card data from the control node with a data link to a dispenser control console.

40. A method as claimed in claim 33 further comprising accepting cash in a cash acceptor in the housing, and communicating cash data from the control node with a data link to a dispenser control console.

41. A method as claimed in claim 33 further comprising delivering transaction data to a receipt printer in the housing from the communications bus through a node and printing a receipt in the receipt printer.

42. A method as claimed in claim 33 wherein said pumping step includes pumping a plurality of different grades of fuel that are subsequently blended together, and controlling the plurality of pumps with a node to achieve a desired blend.

43. A method as claimed in claim 33 comprising delivering video display data to a video display in the housing from the communications bus through a node and displaying a video using the data.

44. A method as claimed in claim 33 for a dispenser having a pump to pump fuel, a fuel flow meter, a switch actuable to indicate fuel is to be pumped, and node for each grade of fuel to be pumped comprising generating a signal through a particular node onto the bus upon actuation of the switch associated with the grade to be pumped, pumping fuel with the pump associated with the grade to be pumped, and communicating pumped fuel flow data onto the communications bus, while keeping other ones of the pumps idle.

45. A method as claimed in claim 33 for a dispenser having a pump to pump fuel, a fuel flow meter, a switch actuable to indicate fuel is to be pumped, active vapor recovery equipment and a node for each grade of fuel to be pumped comprising generating a signal through a particular node onto the bus upon actuation of the switch associated with the grade to be pumped, pumping fuel with the pump associated with the grade to be pumped, activating the active vapor recovery equipment, and communicating pumped fuel flow data onto the communications bus.

46. A method as claimed in claim 33 for a dispenser having active vapor recovery equipment further comprising upon occurrence of the generating step, transmitting a signal from the communications bus through a node and activating the active vapor recovery equipment.

47. A method as claimed in claim 30 for a dispenser having liquid fuel volume temperature compensation capability further comprising upon occurrence of the generating step, transmitting a liquid fuel temperature signal from a temperature sensor through a node onto the communications bus and thence through another node to permit compensation of the measured volume of fuel dispensed, to account for thermal expansion or contraction of the fuel.

48. A method of controlling a fuel dispenser that has a housing, a pump to pump fuel through the housing, a fuel flow meter in the housing, a switch actuable to indicate fuel is to be pumped through the housing, a display on the housing to display the amount of fuel pumped through the housing, and a at least two microcontroller nodes for dispenser control and a communications bus each microcontroller node connected to the communications bus and including a controller to control a dispenser function, ones of the nodes being associated with one of the switch, pump, fuel flow meter, display, the microcontroller nodes communicating with other of the said microcontroller nodes through the communications bus comprising signaling a first network variable through one of the nodes onto the bus upon actuation of the switch and storing the first network variable on another node, pumping fuel with the pump, communicating a second network variable pertaining to fuel flow from one of the nodes onto the communications bus and storing the second network variables on another node, and using the second network variable to generate a display of the amount of fuel pumped.

* * * * *